United States Patent [19]

Friedrich

[11] Patent Number: 4,938,605
[45] Date of Patent: Jul. 3, 1990

[54] APPARATUS AND METHOD FOR MIXING AND CONTINUOUS EXTRUSION OF A PLASTIC MASS

[75] Inventor: Reinhard Friedrich, Aidlingen, Fed. Rep. of Germany

[73] Assignee: Werner & Pfleiderer GmbH, Stuttgart, Fed. Rep. of Germany

[21] Appl. No.: 200,592

[22] Filed: May 31, 1988

[30] Foreign Application Priority Data

Jun. 19, 1987 [DE] Fed. Rep. of Germany ....... 3720325

[51] Int. Cl.$^5$ .................... B28C 7/04; B28C 7/14
[52] U.S. Cl. ............................... 366/76; 366/97; 366/149; 366/153; 425/145; 425/147; 425/149; 425/202; 425/207; 425/209; 425/308; 425/311
[58] Field of Search ................ 366/75, 76, 77, 78, 366/79, 97, 98, 99, 83, 84, 85, 91, 96, 151, 153, 154, 155, 156, 158, 144, 149; 425/207, 208, 209, 200, 202, 145, 149, 147, 289, 308, 310, 311

[56] References Cited

U.S. PATENT DOCUMENTS 3,704,972 12/1972 Kneller ................................. 366/79
3,726,648 4/1973 Weber ................................. 425/209
3,924,840 12/1975 Nelson ................................. 366/145
4,632,564 12/1986 Kopernicky ......................... 366/76
4,765,745 8/1988 Strecker .............................. 366/76

Primary Examiner—Robert W. Jenkins
Attorney, Agent, or Firm—Roberts, Spiecens & Cohen

[57] ABSTRACT

An apparatus for the mixing and continuous extrusion of a plastic mass having a first stage in which an intermittently operating mixer receives the starting materials batchwise and a second stage having a screw extruder which is supplied at periodic intervals, with material from the intermittent mixer. In order to provide a simple, inexpensive apparatus for two-stage mixing and extruding in which the full output of the first stage can be used and, independently of the state of the intermediate product, a continuous feed of material into the screw extruder of the second stage is effected. The second stage has mixing and kneading blades continuously rotating within a trough and an extrusion screw which extends along the bottom of the trough into an extrusion cylinder. A continuous drive motor for the extrusion screw is controlled so that the trough is always filled at least to 25% of its volume.

16 Claims, 2 Drawing Sheets

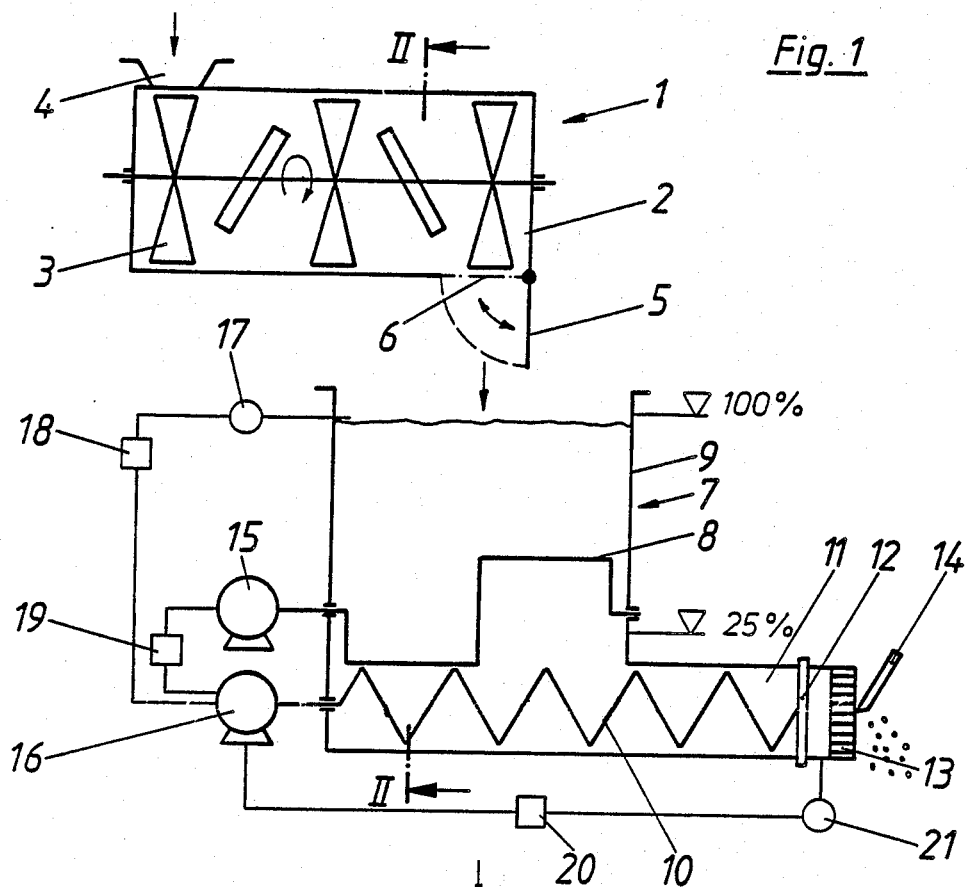
Fig. 1
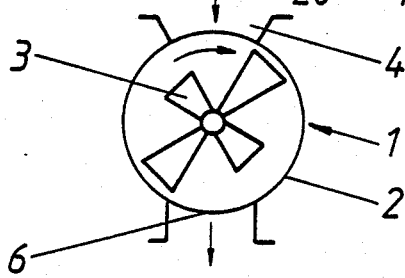
Fig. 2
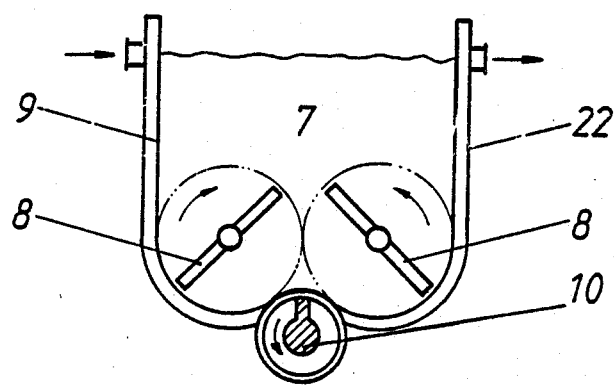

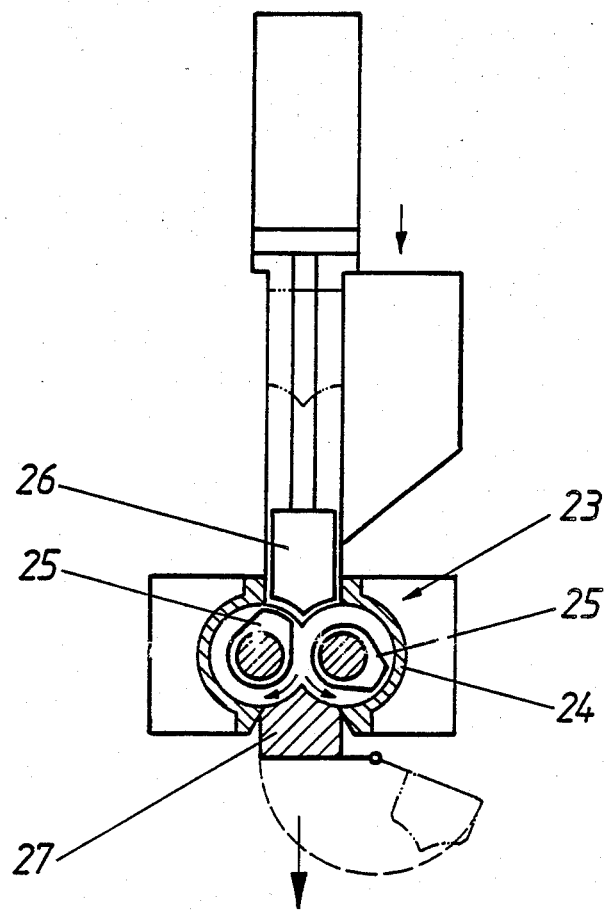
Fig. 3
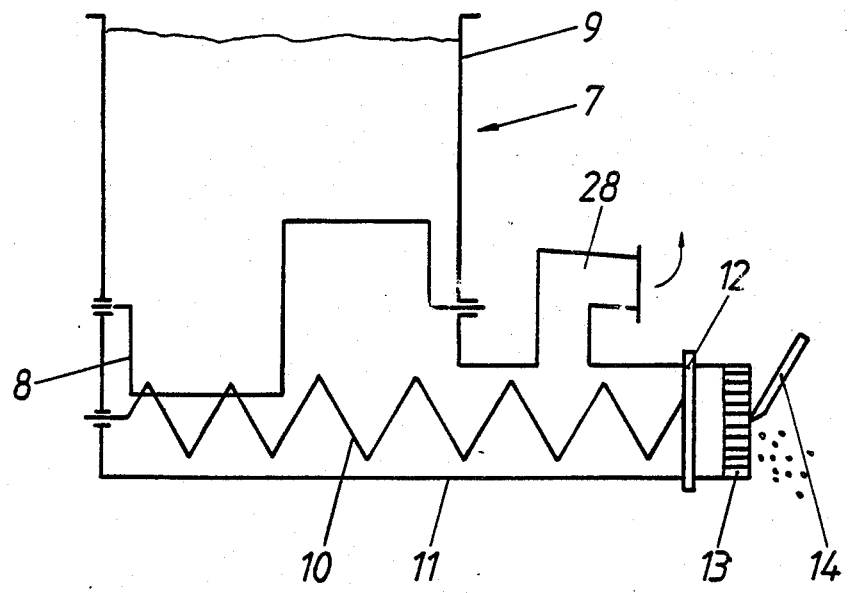

APPARATUS AND METHOD FOR MIXING AND CONTINUOUS EXTRUSION OF A PLASTIC MASS

FIELD OF THE INVENTION

The present invention relates to a method and apparatus for the mixing and continuous extruding of a plastic mass in which, in a first stage, starting materials are mixed in a mixer and in a second stage the mixed materials are extruded.

PRIOR ART

The preparation of plastic masses is presently effected predominantly by means of continuously operating screw extruders. In many cases, the starting substances are brought together batchwise for premixing before being introduced into the extruder. Batch mixing machines used for this purpose are simple in construction and in manner of operation and are better suited, particularly in the case of mixtures having a high solids content, than mixing extruders with special elements. By the premixing operation, it is possible to avoid the difficulties presented by direct continuous charging of the extruder, such as expensive metering devices, unequal feed of the different substances into the extruder screw, etc. The outlet of the extruder is ordinarily formed with a nozzle or an aperture plate with a cutting device, whereby the extruded material can be discharged as a continuous string or as granulates according to the desired final product.

One example of this is the production of a filler or pigment master batch. A filler master batch contains 50 to 90% filler while the percentage of pigment in a pigment master batch is about 20 to 80%. The balance in each case consists of binders, such as plastics, and particularly those of low-viscosity in order to obtain good flowability, or waxes or similar low molecular substances, or mixtures thereof.

It is known to produce mixtures in high speed mixers in which the solids (filler or pigment) are present as a powder and the binders are present as powder granulates (for instance polyethylene, polypropylene) or liquids. High-speed mixers are machines which have a vertical or horizontal cylindrical container and a rapidly rotating mixer tool coaxially therein So much frictional heat is produced within the material to be mixed by the mixing tool, which is driven at 2000-6000 rpm, that the binders become plastic or melt, resulting in adherence to the solids and good dispersion of the solids. The intermediate product obtained in this way can be in powder to crumbly state, frequently also pasty and in extreme cases even a plastic lump.

The use of high speed mixers for the above-indicated purpose is known, for instance, from DE-OS No. 16 04 354. In that apparatus, a plurality of high-speed mixers are arranged above a hopper which leads to a screw extruder. The high-speed mixers operate cyclically and are fed by a common charging device. The charging device is controlled by the cycle time of a dosaging means. The material is discharged from the high speed mixers as chunks in a plastic state and there is the danger that they will remain adherent to the walls of the hopper or be discharged only after a delay into the inlet of the extruder screw. This can lead to considerable disturbances in the operation of the extruder.

In order to avoid such disadvantages, a powder or crumbly state is preferred for the further treatment of the master batch intermediate product in screw extruders. However, in many cases this means that the good mixing or dispersing action of the high speed mixer used as a premixer cannot be fully utilized. Therefore, expensive extruders having special mixing tools, generally twinshaft extruders, must be used for further processing in order to complete the dispersing of the material.

Difficulties similar to those described above with a master batch also occur in the two-stage preparation of PVC. In the first stage, mixing and dispersing are effected by means of a high speed mixer. This processing can also be carried out by an internal mixer which includes a housing having a pair of parallel mixing and kneading tools which rotate in opposite directions. At the end of the mixing process of the first stage, there is again present an intermediate product of pasty consistency or a hot plastic lump. Due to the aforementioned problems in feeding, further processing directly on a screw extruder is not readily possible. Therefore, for the continuous shaping of such masses, extruders with ram injector devices are used, as are employed in the rubber industry and known, for instance, from Swiss Patent No. 258 069, after the internal mixers. This has the disadvantage that the ram or rams which act to promote the feed have dead corners and operate intermittently, so that a uniform flow of material, which is a prerequisite for dependable granulating or production of an extrudate, is not obtained at the outlet of the extruder.

DE-PS No. 11 31 389 discloses a mixing and kneading device for the production of rubber and plastic mixtures in two successive stages. The first stage includes an intermittently operating premixer which is arranged above the inlet of a twin-shaft mixing extruder. At the outlet of the premixer there is an outlet control member which is operated as a function of demand in the second stage. As a result of this control, continuity of the flow of the mass to the second stage is assured. However, in the case of pasty or lump material, a bridge can form in the transition region between the two stages and, as a result thereof, at least a temporary interruption of the feed to the second stage cannot be prevented.

For the production of plastic masses, use can also be made of intermittently operating twin-shaft mixing and kneading machines as are customary, for instance, in the chemical industry for many mixing and kneading operations. Because of the shape of their mixing tools, they are also referred to as a Z-kneader or sigma mixer. The mixing and kneading tools which are arranged in parallel in a trough, rotate in opposite directions and subject the mixture material to intensive relative movements with relatively little shearing action. As a result of a large feed opening, non-pourable mixture components such as lumps of material or entire blocks of rubber can be introduced into the trough. For the removal of paste or plastic masses, it is known to provide such mixing and kneading machines as disclosed in DE-PS No. 1 027 713, and No. 1 058 188, with a screw which extends along the bottom of the mixing and kneading trough up to an extrusion cylinder which is placed at the end of the trough. For the drive of the screw, a reversing gear is advantageous since, in this way, the screw operates during the mixing with a direction of conveyance back into the trough and can thus assist in the mixing and kneading action of the rotating tools. For extrusion, the direction of rotation is reversed whereupon the mixing and kneading tools then push the material into the screw and assure a good entrance into the threads of the screw. In this way, not only can the mixing and kneading trough be conveniently emptied but it is also possible to attach screening devices to the extrusion cylinder for the cleaning of the product. By attachment of extrusion nozzles or aperture plates with cutting devices, strands or granulates can be produced.

These machines have the disadvantage that the batch time is considerably lengthened as a result of the extrusion. During the extrusion, the mixing and kneading tools continue to operate, but no new mixing material is added. The extrusion time therefore represents uneconomical lost time for the mixing and is a considerable cost factor, particularly in the case of mixing troughs of large volume. In many cases, it may amount to 1 to 2 hours, and thus falls within the order of magnitude of the actual mixing time.

Another disadvantage of discontinuous extrusion arises in the shaping of the extruded material. In order to extrude profiled members, manual manipulations are necessary upon each start-up in order to thread the strands into draw-off or windup devices before the continuous operation of these devices commences. At the end of the extrusion process, manual intervention is again necessary. Therefore additional personnel must be kept available for this stepwise extrusion.

SUMMARY OF THE INVENTION

An object of the present invention is to provide a simple and inexpensive device for two stage mixing and extruding of a plastic mass in which the full output of the first stage can be utilized and a continuous introduction of material into the screw extruder of the second stage is assured regardless of the condition of the intermediate product.

This object is achieved in accordance with the invention by employing an intermittently operating mixer in the first stage to which starting materials are fed batch wise and a second stage supplied at intervals by the intermittent mixer and comprising a mixing and kneading device having mixing and kneading blades continuously rotating in a trough at the bottom of which extends an extrusion screw which projects into an extrusion cylinder, the extrusion screw being continuously driven by a drive means which is controlled to maintain an amount of material in the trough representing at least 25% of the volume of the trough.

The invention is based on the surprising finding that a conventional mixing and kneading machine with an extrusion screw, which up to now has always operated intermittently, can be used a continuous extruder in the second stage if a minimum filling level is effected by adjustment of the now continuously running drive of the extrusion screw. In such case, not only are the aforementioned disadvantages eliminated which are present in the ordinary use of such machines, such as dead time of the mixing and kneading tools during the extrusion and cumbersome start-up operation of the subsequent devices for the drawing-off, winding-up or granulating of the extruded materials, but the difficulties occurring in the screw extruders otherwise used as a second stage, which in particular, include feed problems, are also eliminated. Since the trough of the mixing and kneading machine has a relatively large volume as a result of its manner of construction and, accordingly, also has a wide feed opening, the feeding is practically free from problems. The intermediate product produced in the first stage can therefore be fed to the second stage in the form of crumbs or paste or even plastic lumps. With respect to the condition of the intermediate product, the mixing time of the first stage is thus not subject to any limitation and the intermittent mixer used there can be operated in optimum manner with respect to mixing time, temperature and consistency of the intermediate product. The trough of the mixing and kneading machine of the second stage serves to a certain extent as a buffer between the two stages, the material not being able to adhere due to the continuous movement of the mixing and kneading tools and also not being able to form a bridge. In addition, the mixing and kneading tools effect homogenizing of the material still present in the trough with the intermediate product which is newly added upon each feed interval of the first stage. Finally, by the action of the mixing and kneading tools, the feeding of material into the extrusion screw is promoted since upon their rotation they scrape the material into the threads of the extrusion screw. By the continuous drive of the extrusion screw in the direction of discharge, completely continuous extrusion of a profiled member or granulation is possible. The drawoff or winding device for the strands or the granulating device need be placed in operation only once, i.e. at the start of production or of the shift, which is manifested in the uniformity of the final product. Seen as a whole, the novel use of the mixing and kneading device with its extrusion screw represents an advantageous streamlining measure.

The construction of the second stage as a twinshaft Z-kneader with an extrusion worm is also advantageous. The Z-shaped mixing and kneading tools, from which the machine gets its name, produce an excellent mixing and homogenizing of the entire contents of the trough.

The cycle time, i.e., the pure mixing time including the times for the loading and emptying, as well as the batch size of the first stage are adapted to the trough volume of the mixing and kneading machine and the conveyance by the extrusion screw so that the amount of material present in the trough of the second stage is 25 to 100% of the volume of the trough. A lesser filling of the trough than 25% would impair the loading of the extrusion screw and thus also the uniformity of the delivery. Since both the mixer of the first stage and the Z-kneader of the second stage are available in different structural sizes on the market, a rough adaptation is already possible by the selection of the mixers. A fine adjustment is effected by controlling the drive of the extrusion screw. Particularly in the case of a powdered or crumbly intermediate product, the drive of the extrusion screw can be controlled by level sensors which monitor the height of filling of the trough. If the intermediate product is less flowable, control of the drive of the extrusion screw as a function of the torque of the mixing and kneading tool of the Z-kneader proves advantageous. Another suitable development is control by means of a pressure sensor arranged at the outlet end of the extrusion cylinder.

In a further embodiment of the invention, the trough and/or the mixing and kneading tools of the mixing and kneading device are provided with means for temperature control. These can be, for instance, conventional electric heating elements. The trough of the mixing and kneading device is preferably provided with a jacket through which, if necessary, a heating or cooling fluid flows. If the trough is cooled, then a cooling mixer between the first and second stages which is customary, for instance, in the preparation of PVC, can be eliminated.

In the first stage, there is preferably provided a high-speed of rotation. It is used particularly for the manufacture of a master batch. For other materials, the mixing and kneading device of the first stage can have parallel mixing and kneading tools which are rotatable within a housing or trough. This device can, for instance, in the case of preparation of PVC, be an internal mixer such as used in the processing of rubber, or else a Z-kneader in which, for emptying, the trough is tilted around the axis of one of its mixing and kneading tools or is provided with a bottom outlet. The charging of the batch mixer in the first stage is very economical since, in contradistinction to the feed by a continuous feed system which is otherwise necessary in continuous extrusion, it takes place batchwise, for instance, by emptying measured bags into the mixer or weighing the amounts to be fed.

In this way, even materials which cannot be dosed, such as lumpy or sticky substances or even entire blocks of rubber, can be added.

Degassification, which is necessary for certain masses prior to their shaping in order to eliminate traces of solvent, gas inclusions or the like, is effected in the extrusion cylinder of the mixing and kneading device by providing a degassification connection for connection to a vacuum source.

BRIEF DESCRIPTION OF THE FIGURES OF THE DRAWING

FIG. 1 is a vertical longitudinal section diagrammatically illustrating a two-stage device for mixing and continuous extruding;

FIG. 2 is a vertical cross section taken along line II—II in FIG. 1; and

FIG. 3 is a vertical section through another embodiment of a two stage device.

DETAILED DESCRIPTION OF PREFERRED EMBODIMENTS

Referring to FIG. 1, therein is seen a two stage mixing and extruding device, the first stage of which comprises an intermittently operating high-speed mixer 1 to which starting materials are fed batchwise. The mixer 1 comprises a horizontal cylindrical housing 2 and a mixing tool 3 driven at a high speed of rotation coaxially within the housing. The material to be mixed is fed to the mixer 1 through a hopper 4 located at an inlet end of the housing 2. At the opposite end of the housing, there is an outlet 6 which can be closed by a pivotal flap 5.

The second stage of the device comprises a mixing and kneading apparatus in the form of a Z-kneader having two mixing and kneading blades 8 which rotate in a trough 9 around parallel axes. At the bottom of the trough, parallel to the mixing and kneading blades 8, there is arranged an extrusion screw 10 which extends into an extrusion cylinder 11 projecting at the end of the trough 9. At the outlet end of the extrusion cylinder 11, there is a screening device 12 and an aperture plate 13 provided with a cutting device 14.

The maximum filling level of the trough 9 is designated by the level indication at 100%. The minimum filling level which must not be gone below in operation is designated by the level indication at 25%. A motor 15 drives the mixing and kneading blades 8. Another motor 16 drives the extrusion screw 10. The speed of rotation of motor 16 is so regulated that the trough 9 is always filled at least up to the 25% level mark. The control of the motor 16 can be effected manually in response to visual observation of the level of the material in trough 9, but preferably the control is effected automatically. For this purpose, there is provided, as shown in FIG. 1, a level sensor 17 which monitors the 100% level mark and is connected to a controller 18. A second level sensor (not shown) is provided at the 25% level. Another type of control operates in response to torque signals from the motor 15 driving the mixing and kneading blades 8, these signals being fed to a controller 19. Another form of control includes a pressure sensor 21 arranged at the outlet end of the extrusion cylinder 11 and connected to a controller 20, said pressure sensor monitoring the pressure in the extrusion cylinder 11.

In accordance with the operation of the sensors, the controllers 19, 20, 21 cause the motor 16 to increase or reduce its speed of rotation and thus change the delivery of the extrusion screw 10. In order to control the temperature of the mixture material, the trough 9 is surrounded by a jacket 22 (FIG. 2) which, if necessary, can be traversed by a heating or cooling fluid.

FIG. 3 shows an embodiment in which, in distinction with the embodiment in FIG. 1, comprises an internal mixer 23 as the first stage. Mixer 23 includes a housing 24 defining an inner space comprised of two overlapped cylindrical bores defining a cross section in the shape of a numeral eight on its side. In the space in housing 24 are two mixing and kneading tools 25 arranged for rotation about parallel axes. A ram 26 extends into a filling inlet at the top of the housing 24 during a batchwise feed operation to press the material into the field of action of the mixing and kneading tools 25. This is why these machines are also referred to as ram kneaders. At the bottom of the housing there is a pivoted saddle 27 which is swung to the side for emptying as shown in chain dotted outline.

The second stage comprises a mixing and kneading apparatus which is identical to the Z-kneader shown in FIG. 1, and accordingly, the same reference numbers as in FIG. 1 are employed to designate the same elements. The extrusion cylinder 11 has, in addition, a degassification connection 28 which is connected to a vacuum device (not shown).

The duration of the mixture cycle in the intermittently operating mixers of the first stage varies according to the construction of the mixer and the composition of the mixture material. With a high-speed mixer such as shown in FIG. 1, the mixing time is between 5 to 60 sec. and preferably 10 to 25 sec. It is controlled by an infrared temperature probe which opens the pivotal flap 5 when a predetermined temperature is reached. By means of a follow-up control, the feed for the next cycle commences upon the closing of the flap 5. The times for emptying and filling are about 5 sec. each. In another known high-speed mixer with a vertical cylindrical container and mixing tools rotating therein in the vicinity of the bottom around a vertical axis, as a result of which a waterspout-shaped movement is imparted to the mixture material, the mixing time is between 30 sec. and 5 min., and preferably is 2 min. The time for emptying is about 30 sec. and the time for filling about 5 sec. In the case of an internal mixer 23, such as shown in FIG. 3, the mixing takes place within a period of 1 to 10 min., preferably about 5 min. Emptying is effected in about 10 sec. and filling in about 5 sec. When a Z-kneader is provided as the first stage, the mixing takes place for 5 min. to 1 hr., and preferably about 30 min., the emptying being about 1 to 5 min., and the filling about 5 sec.

The manner of operation of the apparatus according to FIGS. 1 and 2 will be described with reference to the following example.

EXAMPLE

A polyethylene/chalk master batch containing 90% chalk with a throughput of 500 kg/hr was to be produced.

The second stage was a Z-kneader 7 whose trough 9 had a volume of 80 liters and whose extrusion screw 10 had a diameter of 100 mm. The level of the material in the trough 9 was established to provide 50 kg with a mean dwell time of 6 mins. In the high speed mixer 1 of the first stage, the material gels in 26 seconds. If a time of 5 sec is provided for the filling and 5 sec for the emptying, then the cycle time in the first stage is 36 sec. The size of the batch is then 5 kg. With a bulk weight of the starting materials of 0.35 kg/liter and a degree of filling of 0.6, the volume in the housing 2 is 23.8 liters whereby a machine having a volume of 25 liters is selected.

Upon start of the operation, the mixing tools 3 of the high speed mixer 1 and the mixing and kneading blades 8 of the Z-kneader 7 are driven in rotation. The extrusion screw 10 is first stationary or operated in reverse direction to convey material backwards into the trough 9. After about ten mixing cycles in the first stage, the material in the trough 9 of the second stage reaches the 100% level. The level sensor 17 then switches the extrusion screw 10 to rotate in the direction of extrusion, as a result of which the motor 16 is activated if the screw 10 is at rest or is reversed, if the extrusion screw has been rotating to feed the material backwards. Thereupon, the extrusion screw 10 conveys the material during the entire duration of the production only in the direction towards the aperture plate 13 of the extrusion cylinder 11. At the same time, the cutting device 14 is also activated. The switching of the motor 16 and screw 10 to extrusion can also take place upon attainment of a given torque on the mixing and kneading blades 8 by producing a signal by the motor 15. Since the high speed mixer 1 of the first stage does not operate for the same length of time upon each charge but is controlled by a temperature probe, variations in the height of filling in the trough 9 can result which are compensated by an increase or reduction of the speed of rotation of the extrusion screw 10. An increase in the speed of rotation is effected when the 100% level is reached as detected by the level sensor 17. A reduction in the speed of rotation is effected if the level mark drops to the 25% level. If the control of the speed of rotation takes place in response to pressure sensor 21 at the outlet end of the extrusion cylinder 11, then the speed of rotation is increased above a given medium pressure (high level) and reduced below a given medium pressure (low level). The speed of rotation of the cutting device 14 changes along with the changed speed of rotation of the extrusion screw 10 so that at all times granulate particles of the same length are obtained.

Although the invention has been described in relation to specific embodiments thereof, it will become apparent to those skilled in the art that numerous modifications and variations can be made within the scope and spirit of the invention as defined in the attached claims.

What is claimed is:

1. An apparatus for the mixing and continuous extrusion of a plastic mass comprising a first stage including an intermittently operating mixer to which starting materials are fed batchwise and a second stage including extruder means supplied at intervals by the intermittent mixer and comprising a mixing and kneading device including mixing and kneading blades continuously rotating in a trough, an extrusion screw extending in said trough beneath said blades and an extrusion cylinder projecting from said trough and into which said extrusion screw extends, drive means for continuous drive of the extrusion screw and control means connected to said drive means for operating the same to maintain an amount of material in said trough representing at least 25% of the volume of the trough.

2. An apparatus as claimed in claim 1 wherein said second stage comprises a twin-shaft Z-kneader.

3. An apparatus as claimed in claim 1 wherein said control means comprises level sensors for monitoring the level of the material in the trough.

4. An apparatus as claimed in claim 1 wherein said control means comprises means responsive to torque developed by the mixing and kneading blades for operating the drive means in response to said torque.

5. An apparatus as claimed in claim 1 wherein control means comprises a pressure sensor coupled to the extrusion cylinder for measuring pressure of the material therein.

6. An apparatus as claimed in claim 1 comprising means for controlling temperature of the material in said second stage.

7. An apparatus as claimed in claim 6 wherein said trough includes a surrounding jacket and said means for controlling temperature of the material comprises means for effecting fluid flow in said jacket.

8. An apparatus as claimed in claim 1 wherein said mixer includes a high speed rotary mixing tool.

9. An apparatus as claimed in claim 1 wherein said mixer comprises two mixing and kneading tools arranged adjacent to one another for rotation about parallel axes.

10. An apparatus as claimed in claim 1 comprising means in said extrusion cylinder for connection with a vacuum source.

11. An apparatus as claimed in claim 1 wherein said trough has a volume which exceeds the output of said intermittently operating mixer and serves as a buffer means for storage of material to be fed to said extrusion screw.

12. A two stage method for mixing and extruding a plastic mass comprising adding batchwise materials to be mixed into an intermittently operated mixer, mixing the materials in the intermittently operated mixer, intermittently discharging the mixed material from the mixer into a buffer trough of a second stage mixing and extrusion apparatus, continuously supplying the mixed material from the buffer trough into continuously operating mixing and kneading blades in the second stage, continuously feeding the thus mixed and kneaded material by the mixing and kneading blades into an extrusion screw, continuously transporting the material by said extrusion screw and extruding and discharging the material from the second stage, sensing the amount of material in said trough and driving the extrusion screw in response to the amount of material in said trough to maintain an amount of said material in said trough representing at least 25% of the volume of said trough.

13. A method as claimed in claim 12 further comprising controlling drive of the extrusion screw in response to torque developed by the mixing and kneading blades.

14. A method as claimed in claim 12 further comprising controlling drive of the extrusion screw in response to pressure developed in the extruding of the material.

15. A method as claimed in claim 12 comprising controlling temperature of the material in the second stage.

16. A method as claimed in claim 12 comprising releasing gases from the material driving the extruding operation.

* * * * *